(12) United States Patent
Rhee

(10) Patent No.: US 9,436,574 B2
(45) Date of Patent: Sep. 6, 2016

(54) METHOD FOR OPERATING INTERFACE WITH EXTERNAL DEVICE AND ELECTRONIC DEVICE IMPLEMENTING THE SAME

(71) Applicant: Samsung Electronics Co., Ltd., Gyeonggi-do (KR)

(72) Inventor: Bongjae Rhee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/494,249

(22) Filed: Sep. 23, 2014

(65) Prior Publication Data

US 2015/0089093 A1    Mar. 26, 2015

(30) Foreign Application Priority Data

Sep. 24, 2013  (KR) .................. 10-2013-0113030

(51) Int. Cl.
| | |
|---|---|
| *G06F 3/00* | (2006.01) |
| *G06F 11/30* | (2006.01) |
| *G06F 11/22* | (2006.01) |
| *G06F 13/40* | (2006.01) |

(52) U.S. Cl.
CPC ....... *G06F 11/3051* (2013.01); *G06F 11/2289* (2013.01); *G06F 11/3089* (2013.01); *G06F 13/4022* (2013.01)

(58) Field of Classification Search
CPC .... G06F 13/102; G06F 13/10; G06F 13/385; G06F 11/3051; G06F 11/3089
See application file for complete search history.

(56) References Cited

U.S. PATENT DOCUMENTS

2011/0167262 A1\*  7/2011  Ross et al. .................... 713/168
2013/0057201 A1\*  3/2013  Wakayama et al. .......... 320/107

FOREIGN PATENT DOCUMENTS

KR    1020040057480    7/2004

\* cited by examiner

*Primary Examiner* — Ernest Unelus
(74) *Attorney, Agent, or Firm* — The Farrell Law Firm, P.C.

(57) ABSTRACT

A method and an apparatus are provided for operating an interface with an external device in an electronic device. A connection of the external device to the electronic device is recognized. It is determined whether the external device is a SAW device. A request signal is transmitted to the SAW device when the external device is the SAW device. A response signal corresponding to the request signal is received from the SAW device. The response signal is processed. Data is output according to the processed response signal.

17 Claims, 17 Drawing Sheets

METHOD FOR OPERATING INTERFACE WITH EXTERNAL DEVICE AND ELECTRONIC DEVICE IMPLEMENTING THE SAME

PRIORITY

This application claims priority under 35 U.S.C. §119(a) to a Korean patent application filed on Sep. 24, 2013 in the Korean Intellectual Property Office and assigned Serial No. 10-2013-0113030, the entire disclosure of which is incorporated herein by reference.

BACKGROUND

1. Field of the Invention

The present invention relates generally to device interface operation, and more particularly, to a method of operating an interface with a device that is located outside of an electronic device, and an electronic device implementing the same.

2. Description of the Related Art

An electronic device may use a universal interface such as, for example, a Universal Serial BUS (USB), for connection with an external device. When using the interface, such as the USB, the external device may communicate with the electronic device by using a corresponding protocol. The external device includes a microprocessor, a memory, and a controller supporting a corresponding protocol such as, for example, a USB controller including an Analog to Digital Converter (ADC). In order to operate the controller, power may be supplied to the external device from the electronic device, or the external device may have its own power supply. Further, when the external device is wirelessly connected to the electronic device, it may require a power supply device as well as a wireless communication circuit.

Since an external device is supplied power from an electronic device or has its own power supply, an internal circuit of the external device is complicated, increasing the production costs of the external device, which may be an obstacle in a commercial use. Further, the external device includes a wireless communication circuit and a power supply device for wireless communication. Accordingly, a volume and a weight of the external device may be increased.

SUMMARY OF THE INVENTION

The present invention has been made to address at least the above problems and/or disadvantages and to provide at least the advantages described below. Accordingly, an aspect of the present invention provides a method of operating an interface between an external device by using a Surface Acoustic Wave (SAW) device capable of reducing a material cost, a volume, and a weight of the external device, and an electronic device implementing the same.

In accordance with an aspect of the present invention, an electronic device is provided that includes a connector configured to connect to an external device. The electronic device also includes a controller configured to determine whether the connected external device is a SAW device, to output a request signal to the SAW device through the connector when the external device is the SAW device, to receive a response signal corresponding to the request signal from the SAW device through the connector, and to process the response signal. The electronic device further includes an output interface unit configured to output data according to a result of processing the response signal.

In accordance with another aspect of the present disclosure, a method is provided for operating an interface with an external device in an electronic device. A connection of the external device to the electronic device is recognized. It is determined whether the external device is a SAW device. A request signal is transmitted to the SAW device when the external device is the SAW device. A response signal corresponding to the request signal is received from the SAW device. The response signal is processed. Data is output according to the processed response signal.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numbers although they are illustrated in different drawings. Detailed descriptions of constructions or processes known in the art may be omitted to avoid obscuring the subject matter of the present invention.

According to embodiments of the present invention, the electronic device may be embodied as, for example, a smartphone, a mobile phone, a camera, a tablet Personal Computer (PC), a notebook PC, a Personal Digital Assistant (PDA), a Portable Multimedia Player (PMP), a wearable device, an electronic clock, a wrist watch, a home appliance (for example, a refrigerator, an air conditioner, a cleaner, an oven, a microwave oven, a washing machine, an air cleaner, etc.), a Television (TV), a Digital Versatile Disk (DVD) player, an audio player, various medical devices (e.g., Magnetic Resonance Angiography (MRA), Magnetic Resonance Imaging (MRI), Computed Tomography (CT), microsonic device), and a navigation device.

According to an embodiment of the present invention, the electronic device includes a transceiver capable of transmitting/receiving a fixed band signal, and may connect to an external device including a SAW device.

According to an embodiment of the present invention, the electronic device may perform an operation of determining whether the external device is a SAW device based on an identification value $Z_{ID}$ of a connected external device, and an operation of recognizing a type of the SAW device based on an identification code of the SAW device to perform an application for the corresponding SAW device. The electronic device, according to an embodiment of the present invention, may provide detection information on physical or chemical change through an application. The electronic device, according to an embodiment of the present invention, includes a storage device, and may indicate information from an interface unit.

Figure 1:
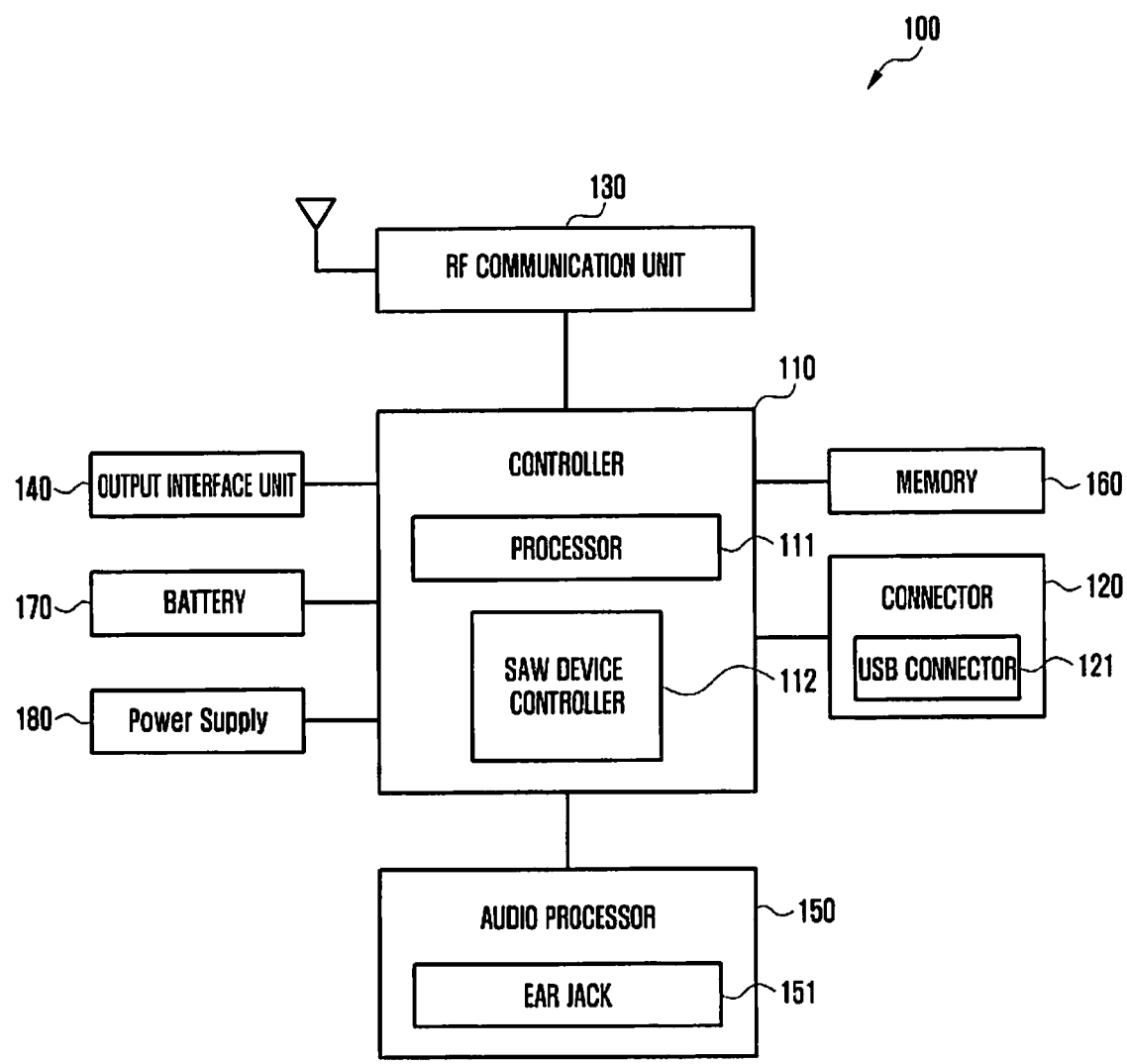
FIG. 1 is a block diagram illustrating a configuration of an electronic device and an external device, according to an embodiment of the present invention.

FIG. 1 is a block diagram illustrating a configuration of an electronic device and an external device, according to an embodiment of the present invention.

Referring to FIG. 1, an electronic device 100 includes a controller 110, a connector 120, a Radio Frequency (RF) communication unit 130, an output interface unit 140, an audio processor 150, a memory 160, and a battery 170.

The controller 110 controls an overall operation of the electronic device 100, controls signal flow between constituent elements of the electronic device 100, and processes data. The controller 110 may control power supply to the constituent elements by using a power supply device such as, for example, a battery 170 or a power supply 180. The controller 110 includes an Application Processor (AP) 111 and a SAW device controller 112.

When the external device is connected to a USB Connector 121, the processor 111 may receive an identification value $Z_{ID}$ of the external device from an ID terminal of the USB connector 121. The processor 111 may determine whether the device is the SAW device based on an identification value $Z_{ID}$ of the external device. The processor 111 may determine a type of SAW device based an ID code recorded in the form of a reflector inside of the SAW device to load a corresponding application.

When the external device is determined to be the SAW device, the SAW device controller 112 transmits and receives a request signal to and from the SAW device. The request signal is a fixed band signal, which may recognize a type of the SAW device. The SAW device controller 112 may transmit the request signal from a transceiver. The request signal may be used to determine an identification code in a reflector of the SAW device. The processor 111 may recognize the identification code to execute a corresponding application. The SAW device controller 112 may transmit a request signal and receive a response signal. The processor 111 may provide various services by using detection information received from the executed application. The SAW device controller 112 is described in greater detail below with reference to FIG. 4.

In general, the connector 120 includes the USB connector 121. The USB connector 121 may maintain an electrical connection of a peripheral device. When the external device is connected to the USB connector 121, the identification value $Z_{ID}$ of the external device may be transferred to the to controller 110. The controller 110 may determine the SAW device based on the identification value $Z_{ID}$ and recognize a type of the SAW device to execute a corresponding application.

The RF communication unit 130 may wirelessly communicate with an external SAW sensor under the control of the controller 110. The RF communication unit 130 may include a Power Amplifier (PA) and a Low Noise Amplifier (LNA). When an amplified signal is required because the RF communication unit 130 is far away from the SAW sensor, the RF communication unit 130 may use the PA and the LNA. When an amplified signal is required because the PA is far away from the SAW sensor, the PA may amplify a signal. The LNA may reduce the noise factor of the whole receiver. If the electronic device is not far away from the SAW sensor or the transmission/reception sensitivity is great, the PA and the LNA may be omitted. The controller 110 may control an antenna and a switch connected between the PA and the LNA.

The output interface unit 140 may include a display unit that can convert the detection information into an image, a speaker that can convert the detection information into a sound, and a vibration motor that can convert the detection information into vibration. The output interface unit 140 may express the detection information with various applications under the control of the controller, particularly, of the processor 111.

The audio processor 150 includes an ear jack 151. The ear jack 151 may include a physical connector of the electronic device, which can be used as the connector 120 instead of the USB connector 121.

The memory 160 may store data generated according to an operation of the electronic device 100, or received from the external device through the RF communication unit 130. The memory 160 may include a buffer as a temporary data storage. The memory 160 may store various preset information (e.g., screen brightness) to set a use environment of the electronic device. Accordingly, the controller 110 may operate the electronic device with reference to the set information. The memory 160 may store various programs to operate the electronic device, for example, a booting program, at least one Operating System (OS), and various applications.

The memory 160 may include a main memory and a secondary memory. For example, the main memory may be implemented by a Random Access Memory (RAM). The secondary memory may be implemented by a disk, the RAM, a Read Only Memory (ROM), or a flash memory. The main memory may store various programs loaded from the secondary memory, for example, a booting program, an OS, and an application.

When power is required for the external device, the battery 170 may supply the power.

Figure 2:
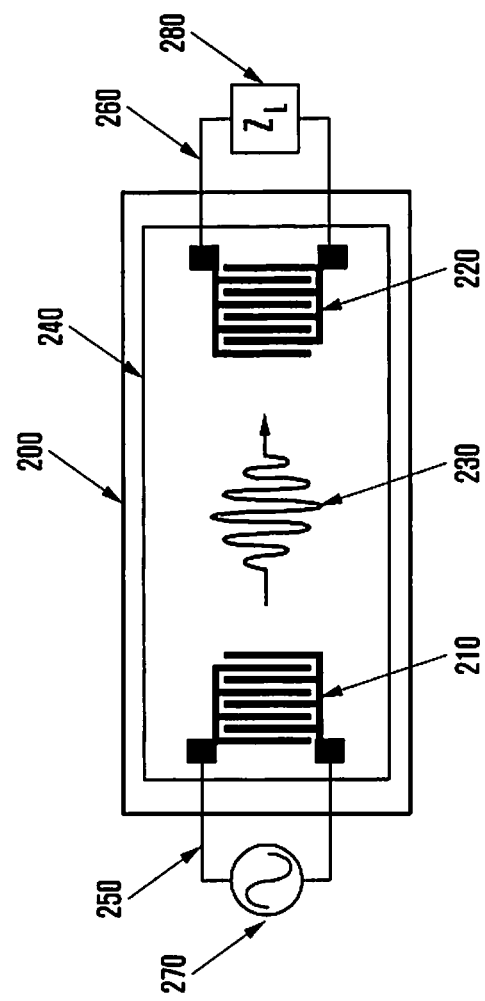
FIG. 2 is a diagram illustrating a basic structure of a SAW device, according to an embodiment of the present invention.

FIG. 2 is a diagram illustrating a basic structure of a SAW device, according to an embodiment of the present invention.

Referring to FIG. 2, a SAW device 200 includes an input IDT 210, an output IDT 220, a piezoelectric substrate 240, a signal input/output terminal 250, and an external sensor connection terminal 260. A part 270 applying an electrical signal to the SAW device 200 and an external sensor 280 are connected to the input IDT 210 and the output IDT 220, respectively, outside of the SAW device 200.

The input IDT 210 may provide a function that converts an electrical signal into an elastic wave, which is a mechanical vibration. The output IDT 220 may provide a function that converts the acoustic wave, which is a mechanical vibration, into an electrical signal. When an electrical signal having a specific frequency is applied to the input IDT 210, a SAW 230 may be generated on a surface of the piezoelectric substrate 240 by the input IDT 210, and the SAW 230 may be propagated. The SAW 230 is converted into an electrical signal by the output IDT 220.

If a physical or chemical change occurs in a section to which the SAW 230 is transmitted, propagation speed, size, phase, and frequency are changed in the SAW. The physical or chemical change may include pressure, rotary power, shock, tension, gravity, mass, evaporation, biological chemistry, temperature, humidity, freezing, viscosity, displacement, flow, exposure to light, light angle, acceleration, abrasion, and pollution. In this manner, the SAW device may be variously used to detect physical or chemical change.

The SAW 230 is a mechanical vibration propagated along a surface of the acoustic substrate 240. The SAW sensor is a sensor using a SAW device and detects the change of the propagation speed, the size, the phase, and the frequency of the SAW 230 due to physical or chemical change. For example, the SAW sensor may include a transformation sensor or a pressure sensor to delay a phase by distorting a propagation path, a load cell, a displacement sensor, a temperature sensor using temperature dependency of an elastic coefficient of the piezoelectric substrate, a waterdrop sensor using a propagation speed change of the SAW when waterdrop is attached on the piezoelectric substrate, and a humidity sensor.

TABLE 1

Example of physical SAW sensor and chemical SAW sensor

| Physical SAW sensor | | |
|---|---|---|
| Measured target | Substrate material | Sensitivity |
| Pressure | AlN/Si | 27 ppm/kPa |
| Force | LiNbO$_3$ | 10.8 ppm/kN |
| Strain | PZT | 21 ppm/10$^{-6}$ |
| Position (linear) | LiNbO$_3$ | 120.5 ppm/μm |
| Acceleration | Quartz | 45 ppm/(m/s$^2$) |
| Flow rate | LiNbO$_3$ | 204 ppm/(cm$^3$/s) |
| Liquid viscosity | LiNbO$_3$ | 2.7 ppm/cP |
| Liquid density | ZnO/Si$_x$N$_X$ | 30000 ppm/(g/cm$^3$) |
| Electric field | Li$_2$B$_4$O$_7$ | 300 ppm/(V/μm) |
| Voltage | LiNbO$_3$ | 0.93 ppm/V |
| Liquid conductivity | LiTaO$_3$ | 13400 ppm/(S/m) |
| Magnetic field | FeB/Quartz | 0.38 ppm/(A/m) |
| Temperature | LiNbO$_3$ | 92.13 ppm/° C. |
| Radiation dose | Quartz | 0.48 ppm/(J/Kg)$^{0.5}$ |
| Thin film thickness | LiNbO$_3$ | 9.25 ppm/nm |

| Chemical SAW sensor | |
|---|---|
| Measured target | Sensitivity |
| H$_2$O | 507.6 |
| CO$_2$ | |
| H$_2$S | 5 |
| NO$_2$ | 13.1 |
| Octane(alkane) | 0.1 |
| Etanol (alcol) | 0.9 |
| Acetone (ketone) | 0.6 |
| Acetic acid (carboxulic acid) | 0.007 |
| Dimethylmethylphosphonate (organophosporous compound) | 0.15 |
| Toluene(aromatic compound) | 7.2 |
| Dichloromethane (chlorin, hydrocarb) | 1 |
| Citral (terpene) | 45.2 |
| Tetrahydrofuran (heterocyclic comp) | 0.002 |

Table 1 shows an example of a physical SAW sensor and a chemical SAW sensor.

Referring to Table 1, the SAW device 200 may determine a measured target according to a material of the substrate 240. For example, pressure, which is a first measured target of the physical SAW sensor, represents a sensitivity having 27 ppm/kPa in the SAW device 200 having an AlN/Si substrate (piezoelectric thin film). In this manner, each measured target may be expressed with a specific numeral in response to physical or chemical change according to a material of a SAW substrate or a material coated on a substrate. The SAW device 200 has various measured targets, which can be sensed through transformation of the basic structure of the SAW device 200.

The SAW device 200 may be mass-produced at a low cost by using an etching processing in a semiconductor process. Further, since the SAW device 200 can be operated wirelessly without power, a wireless communication circuit and a power supply device are unnecessary in a sensor that is developed as a no-power wireless SAW device. Accordingly, the SAW device 200 does not increase a material cost, a volume, and a weight of the external device. The SAW device 200 may be used as a sensor, and, further, may connect the output IDT 220 to the external sensor 280, which has another scheme that is not developed as the SAW device.

If an electrical signal is applied to the input IDT 210, the electrical signal is converted into the SAW 230 and propagated to the output IDT 220. The SAW is converted into the electrical signal in the output IDT 220. A magnitude, a phase, and a frequency of the electrical signal vary in proportion to an impedance of the external sensor 280. The varied electrical signal is converted into the SAW 230 in the output IDT 220, and the SAW 230 is reflected to the input IDT 210.

This reflective wave is converted again into the electric signal in the input IDT 210. Since the electrical signal is modulated according to impedance of the external sensor 280, if the electrical signal is demodulated, the processor 111 may recognize impedance of the external sensor 280. That is, if the SAW device 200 is located between the external sensor 280 and the electronic device 100, another sensor, which is not developed as the SAW device 200, may be connected by using a SAW interface. Accordingly, the SAW interface may be used as a standard interface scheme for most sensors. That is, the SAW device 200 may be used to connect various sensors where impedance varies according to physical or chemical change with the output IDT. Various sensors may be manufactured by transforming the basic structure of the SAW device 200. Further, other sensors may be connected by using the interface of the SAW sensor. In addition, the SAW device 200 may include the identification code by inserting a reflector, and may be used by connecting a plurality of sensors by using a plurality of output IDTs.

Figure 3:
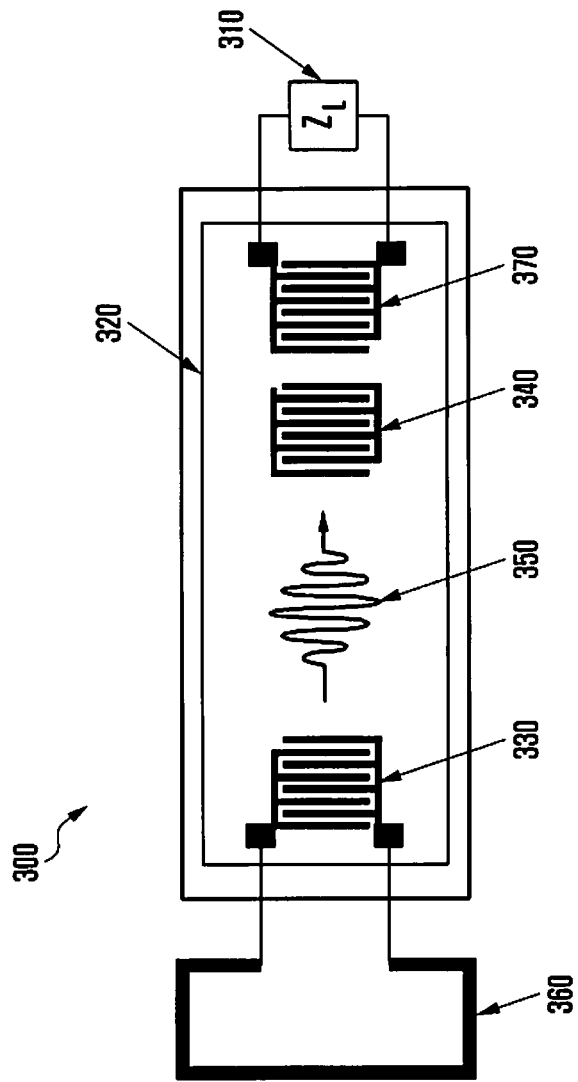
FIG. 3 is a diagram illustrating a wireless power free sensor of the SAW device, according to an embodiment of the present invention.

FIG. 3 is a diagram illustrating a wireless power free sensor of the SAW device, according to an embodiment of the present invention.

A load $Z_L$ 310 is an external sensor having impedance that varies in response to physical or chemical change. Since a SAW substrate 320 may be used as a sensor, the load $Z_L$ 310 may be omitted.

An antenna 360 converts a wireless signal transmitted from the electronic device 100 into an electrical signal, and transfers the electrical signal to an input IDT 330.

A reflector 340 is an IDT inserted into a SAW device 300 in order to measure a reference when a numerical value of the reference varies according to a temperature. Reflectors 340, which can determine an ID code in addition to the reference, may be arranged with various types.

Although the SAW substrate 320 may be used as a sensor, it may be manufactured with a wireless no power sensor, which is the load $Z_L$ 310 having impedance that varies according to external physical or chemical change, by connecting the load $Z_L$ 310 to an output IDT 370. An electrical signal having a specific frequency applied wirelessly through the antenna 360 may be converted into a SAW 350, which is a mechanical signal, by the input IDT 330. If the SAW 350 reaches the output IDT 370, the SAW 350 may be converted again into the electrical signal. The reflective wave, modulated in proportion to the load $Z_L$ 310 connected to the output IDT 370, may be converted into the SAW 350 in the output IDT 370. The SAW 350 can be converted into the electrical signal by the input IDT 330. The electrical signal may be transmitted wirelessly through the antenna 360.

Although an electric wave input through the antenna 360 is propagated with light speed of $3\times10^8$ m/s, the propagation speed of the SAW 350 is about 3,000 m/s, such that the speed may be decreased about 100,000 times. Accordingly, time is delayed by several μsec between an incident wave and a reflected wave. If a wireless sensor circuit outputs an electrical signal having a pulse form and is changed to a reception mode within a certain time, input/output processing can be performed by only the input IDT 330. When the time is delayed for several μsec, the certain time may be recognized as a specific time.

A plurality of reflectors 340 may be inserted into the SAW device 300 instead of the output IDT 370, and a unique ID may be allocated to each SAW device 300 through the reflector. Accordingly, the SAW device 300 may be used as a wireless power free Radio Frequency IDentification (RFID) tag. The RFID, an electronic tag, is a system to identify an ID by using a frequency. The RFID may be considered an improved bar code.

Figure 4:
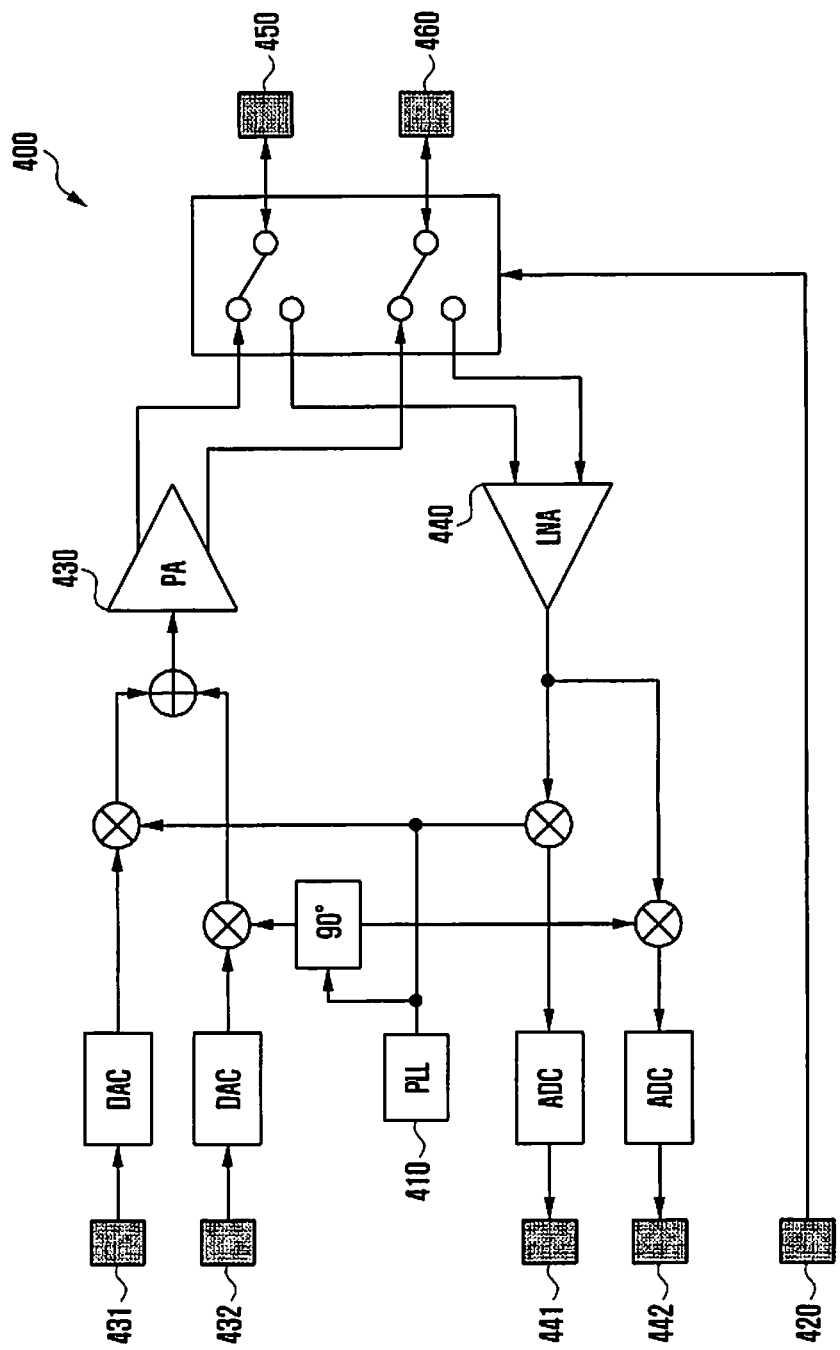
FIG. 4 is a diagram illustrating a transceiver structure inside a SAW device controller of an electronic device, according to an embodiment of the present invention.

FIG. 4 is a diagram illustrating a transceiver structure inside of a SAW device controller of an electronic device, according to an embodiment of the present invention.

Referring to FIG. 4, a transceiver 400 of the SAW device controller 112 may send an electrical signal to the SAW device. The transceiver (Sensor to I/F Block) 400 may generate a specific frequency by using a Phase Locked Loop (PLL) 410. The PLL 410 maintains a signal with a specific phase. That is, the PLL 410 may maintain an exact fixed point by force so that a phase of a periodic signal may not be swayed. The transceiver may modulate and demodulate an RF input/output for processing a signal of the external device by using the PLL 410. The modulation/demodulation includes modulation and demodulation. The modulation changes amplitude, frequency, and phase of a carrier wave having a high frequency and a certain amplitude according to a signal wave having a low frequency. The demodulation means that a receiver extracts a modulation wave from a high frequency signal and restores an original signal. For example, the SAW device controller 112 may control a controller (CTRL) terminal 420 of the transceiver 400 to determine an operation to an output mode or an input mode. And a Power Amplifier (PA) 430 may amplify a signal. A Low Noise Amplifier (LNA) 440 may reduce a noise factor of the whole receiver. If the electronic device 100 is not far away from the SAW sensor or the transmission/reception sensitivity is great, the PA 430 and the LNA 440 may be omitted. The electronic device 100 may modulate a input signal 431, 432 and extract the input signal 431, 432 to a Radio Frequency (RF) terminal 450, 460. And the electronic device 100 may receive a output signal 441, 442 through the Radio Frequency (RF) terminal 450, 460 and demodulate the output signal 441, 442.

Figure 5:
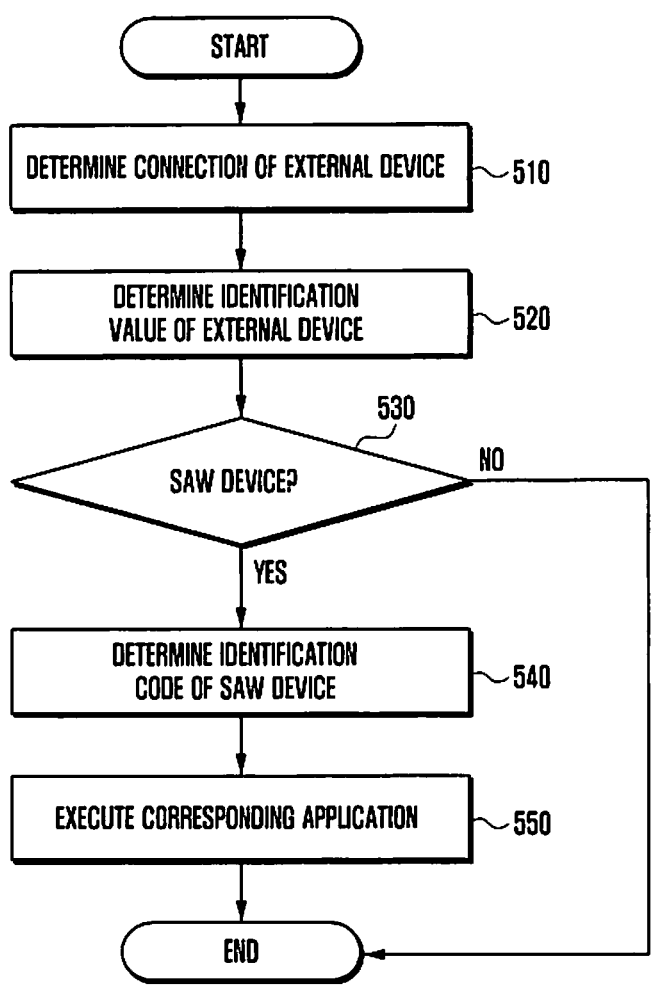
FIG. 5 is a flowchart illustrating an operation of a controller of the electronic device, according to an embodiment of the present invention.

FIG. 5 is a flowchart illustrating an operation of a controller of the electronic device, according to an embodiment of the present invention.

Referring to FIG. 5, the controller 110 determines that the external device is connected to the connector 120, in step 510. The connector 120 usually includes the USB connector 121 and may include the ear jack 151. The controller 110 determines the ID value $Z_{ID}$ of a connected external device, in step 520. The controller 110 determines whether the external device is a SAW device based on the ID value $Z_{ID}$ of the external device, in step 530. If the external device is not the SAW device, the controller 110 maintains a normal state. If the external device is the SAW device, the SAW device controller 112 of the controller 110 transmits a fixed band signal to determine the ID code of the SAW device, in step 540. The controller 110 executes a corresponding application for the SAW device based on the identification code of the SAW device, in step 550.

Figure 6:
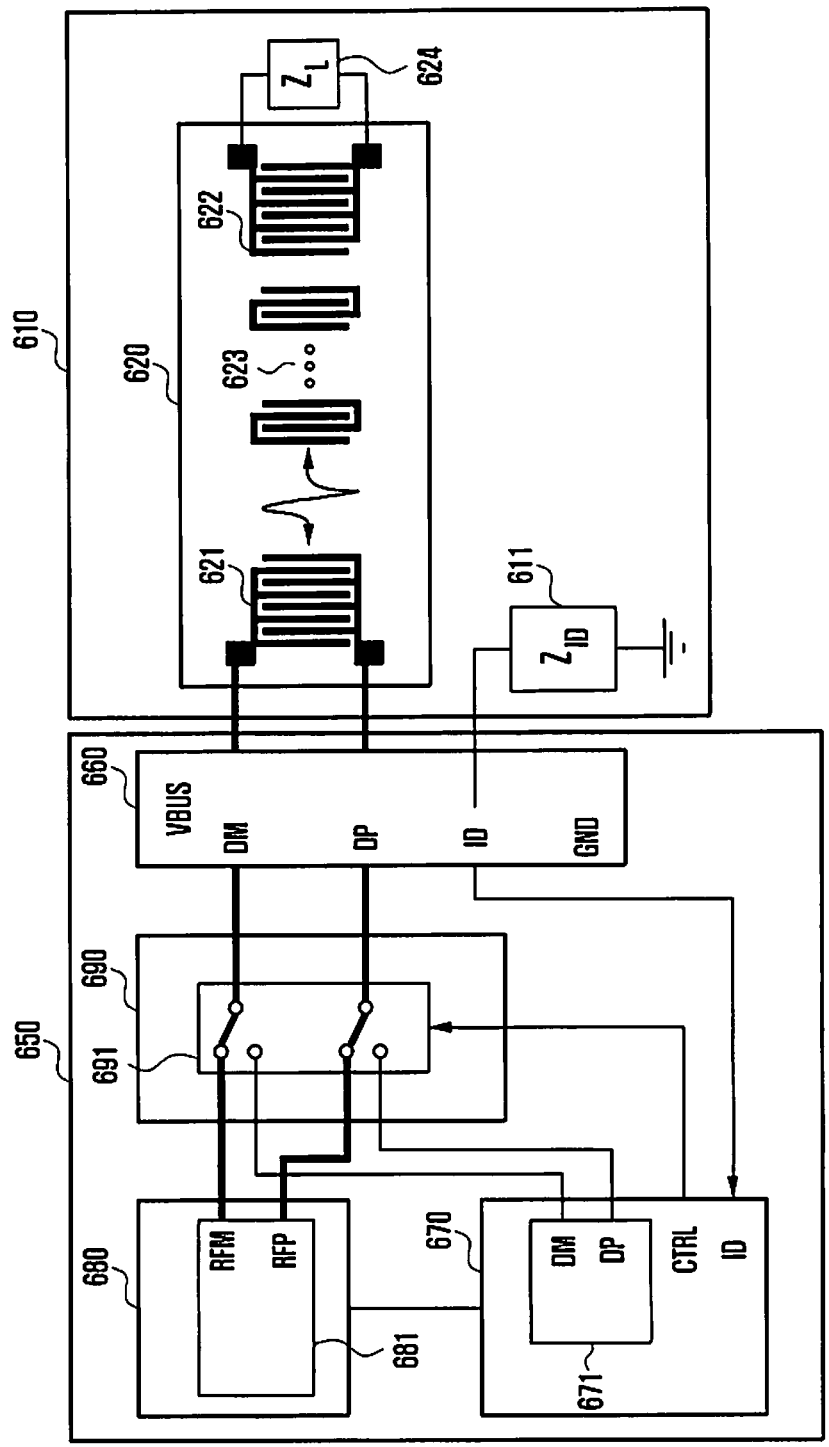
FIG. 6 is a diagram illustrating a basic structure of an electronic device and an external device using a SAW device, according to an embodiment of the present invention.

FIG. 6 is a diagram illustrating a basic structure of an electronic device and an external device using a SAW device, according to an embodiment of the present invention.

FIG. 6 illustrates a structure in which an external device 610 is connected to a USB interface. The USB interface may be a representative interface used for the electronic device.

Referring to FIG. 6, an electronic device 650 includes a transceiver 681, which can transmit/receive a fixed band signal.

If the external device 610 is connected to a USB connector 660, a processor 670 may recognize an ID value $Z_{ID}$ 611 of the external device 610 connected to an ID terminal of the USB connector 660. The processor 670 may determine whether the external device is the SAW device based on the ID value $Z_{ID}$ 611 of the external device 610.

If it is determined that the external device 610 is a SAW device 620, a CTRL terminal of the processor 670 may switch a multiplexer (MUX) 691 of an interface Integrated Circuit (IC) 690 so that a transceiver 681 may be connected to the USB connector 660. Accordingly, the transceiver 681 of the SAW controller 680 may send a fixed band signal to the SAW device 620. The processor 670 may determine the ID code of the SAW device 620 from a reflector 623 based on the fixed band signal of the transceiver 681. The transceiver 681 can be changed into an input mode after transmitting a fixed band signal to the SAW device 620 in an output mode. After the fixed band signal is output, a reflective wave may be returned from the SAW device 620 for a certain delay time. If the SAW, which is a mechanical vibration, is propagated in a space between an input IDT 621 and an output IDT 622, at a propagation speed of about 3,000 m/s, the external device 610 may be designed so that a time delay of about several μsec for the reflective wave may occur. The transceiver 681 may be changed from the output mode to the input mode for the delay time. If the input/output of the fixed band signal occurs, the ID code of the SAW device using the reflector 623 and a reflective wave corresponding to a sensing value of impedance, which is varied by passing through a load ZL 624, may be input. This input/output is periodically repeated so that the processor 670 updates the identification code and the sensing value of the SAW device. The processor 670 may determine the identification code of the SAW device to operate a corresponding application. The application may variously use the sensing value.

Figure 7:
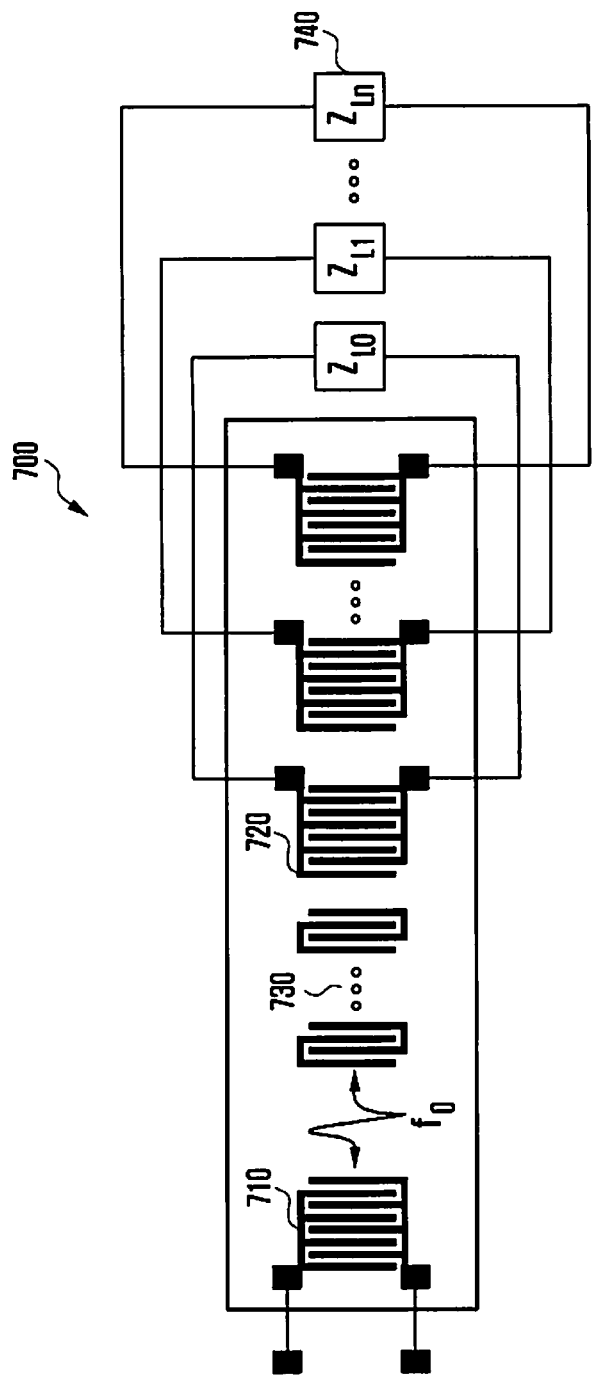
FIG. 7 is a diagram illustrating a structure in which an output InterDigital Transducer (IDT) of the SAW device is connected in series, according to an embodiment of the present invention.

FIG. 7 is a diagram illustrating a structure where an output IDT of the SAW device is connected in series, according to an embodiment of the present invention.

Referring to FIG. 7, when the identification code frequency of a SAW device 700 is identical with a sensing value frequency of a load $Z_L$ 740, the processor 111 may utilize a plurality of loads $Z_L$ 740, which are connected in series. The SAW device 700 may include an input IDT 710, a plurality of output IDTs 720, and the plurality of loads $Z_L$ 740 respectively connected to the output IDTs 720. The processor 111 may determine a type of the SAW device based on the identification code of the external device read from the reflector 730 when first connecting. If the output IDT 720 is a composite sensor connected in series, the processor 111 may sequentially receive the sensing value of each load $Z_L$ 740. If an application, which can respectively process various sensing values, is connected to be processed, the composite sensor may simply connected.

Figure 8:
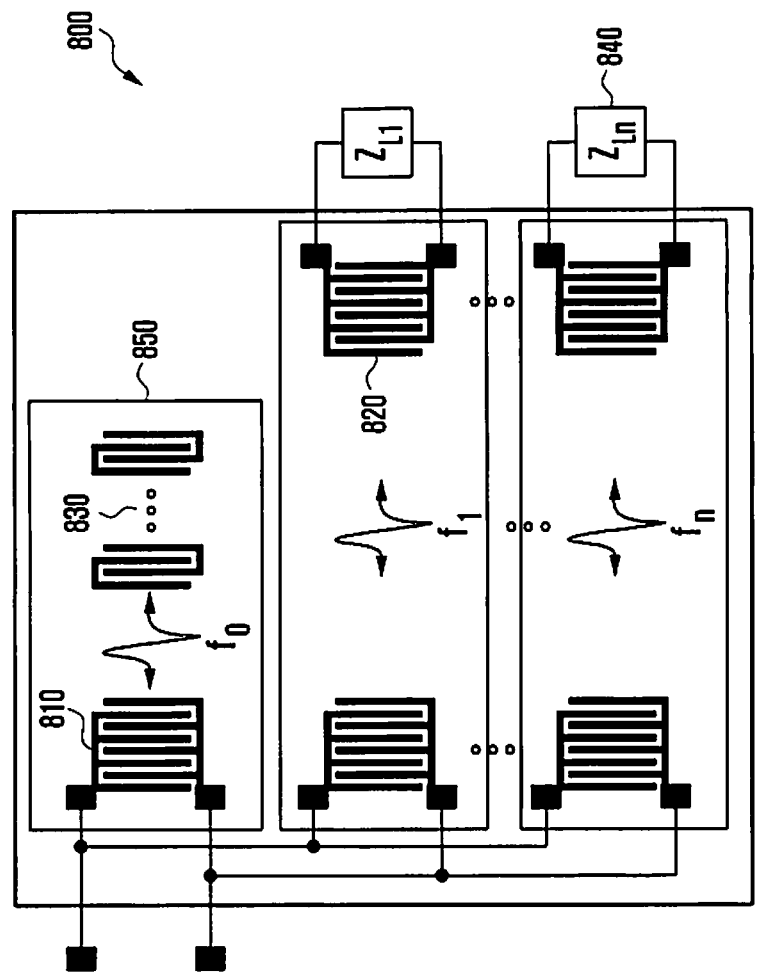
FIG. 8 is a diagram illustrating a structure in which an input IDT of a SAW device is connected to an output IDT of the SAW device in parallel, according to an embodiment of the present invention.

FIG. 8 is a diagram illustrating a structure in which an input IDT of a SAW device is connected to an output IDT of the SAW device in parallel, according to an embodiment of the present invention.

Referring to FIG. 8, when the identification code frequency of a SAW device 800 is different from the sensing value frequency of a load $Z_{Ln}$, the processor 111 may utilize a plurality of loads $Z_{Ln}$ 840, which are connected in parallel. The SAW device 800 may include a reflector 830, which can determine the identification code, and the plurality of loads $Z_{Ln}$ 840, which are connected in parallel. The processor 111 may determine that the external device 800 is a composite sensor where the loads $Z_{Ln}$ 840 are connected in parallel. An input IDT 810 and an output IDT 820, which are connected in parallel, may be manufactured on different substrates respectively, and each substrate may become a sensor without connection of the loads $Z_{Ln}$ 840. The input IDT 810 and the output IDT 820 may be designed so that each load $Z_{Ln}$ may be operated in a different frequency by using high kurtosis/skewness, which is an advantage of the SAW device. The processor 111 may read a sensing value of each load $Z_{Ln}$ while changing a frequency by controlling a phase lock loop of the SAW device controller 112. Accordingly, the processor 111 may selectively connect only a desired input IDT and output IDT. Each load $Z_L$ 840 may be separately manufactured according to a use and may be connected in parallel.

Figure 9:
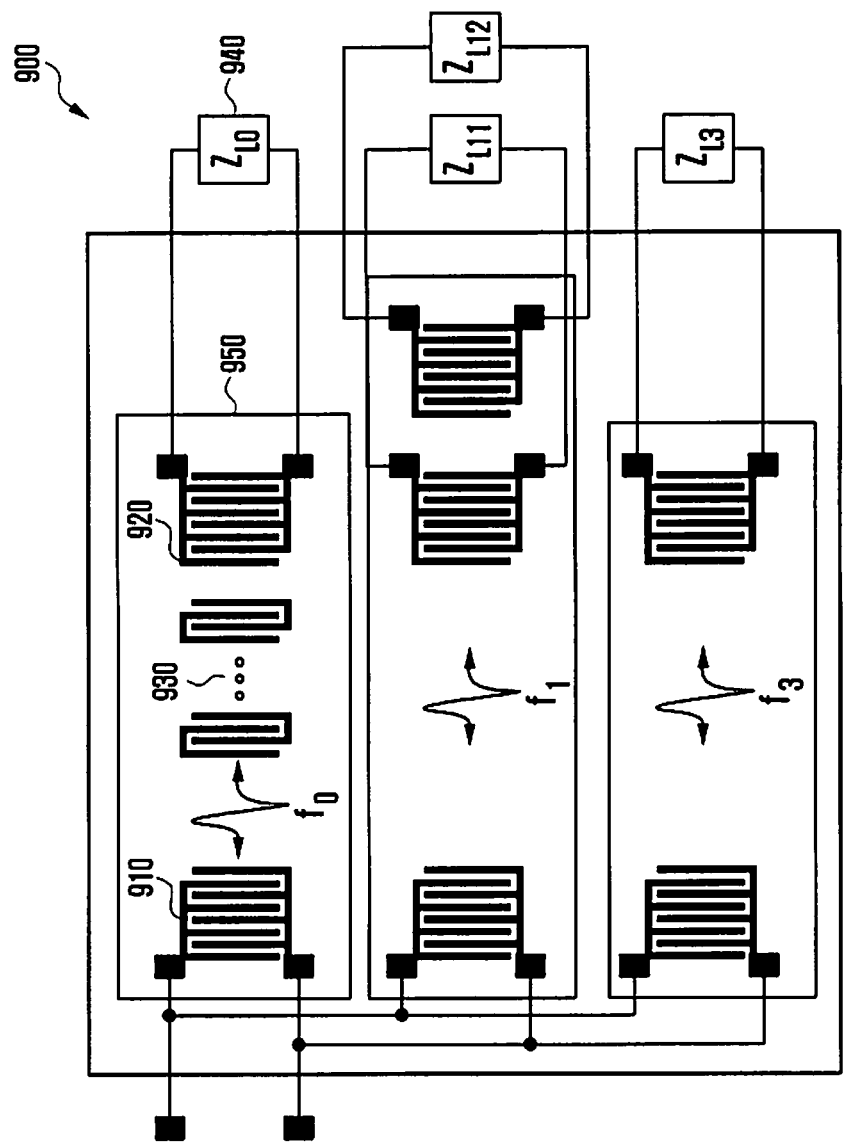
FIG. 9 is a diagram illustrating a serial/parallel arrangement in which sensor deployment of FIGS. 7 and 8 are mixed, according to an embodiment of the present invention.

FIG. 9 is a diagram illustrating a serial/parallel arrangement in which sensor deployment of FIGS. 7 and 8 are mixed, according to an embodiment of the present invention.

Referring to FIG. 9, the processor 111 may determine the ID code of a SAW device 900 in a reflector 930 by a fixed band signal. The SAW device 900 may manufacture SAW device substrates 950 in parallel. Further, each to SAW device substrate 950 may connect a plurality of loads $Z_L$ 940 in series. Accordingly, the processor 111 may selectively connect only a desired SAW device substrate 950, and respective SAW device substrates 950 connect loads $Z_L$ 940 in series to use variously. In addition, although respective SAW device substrates 950 may be manufactured by using different types of substrates, an input IDT 910, an output IDT 920, and the reflector 930 may be spatially distributed on one substrate to be manufactured.

Figure 10:
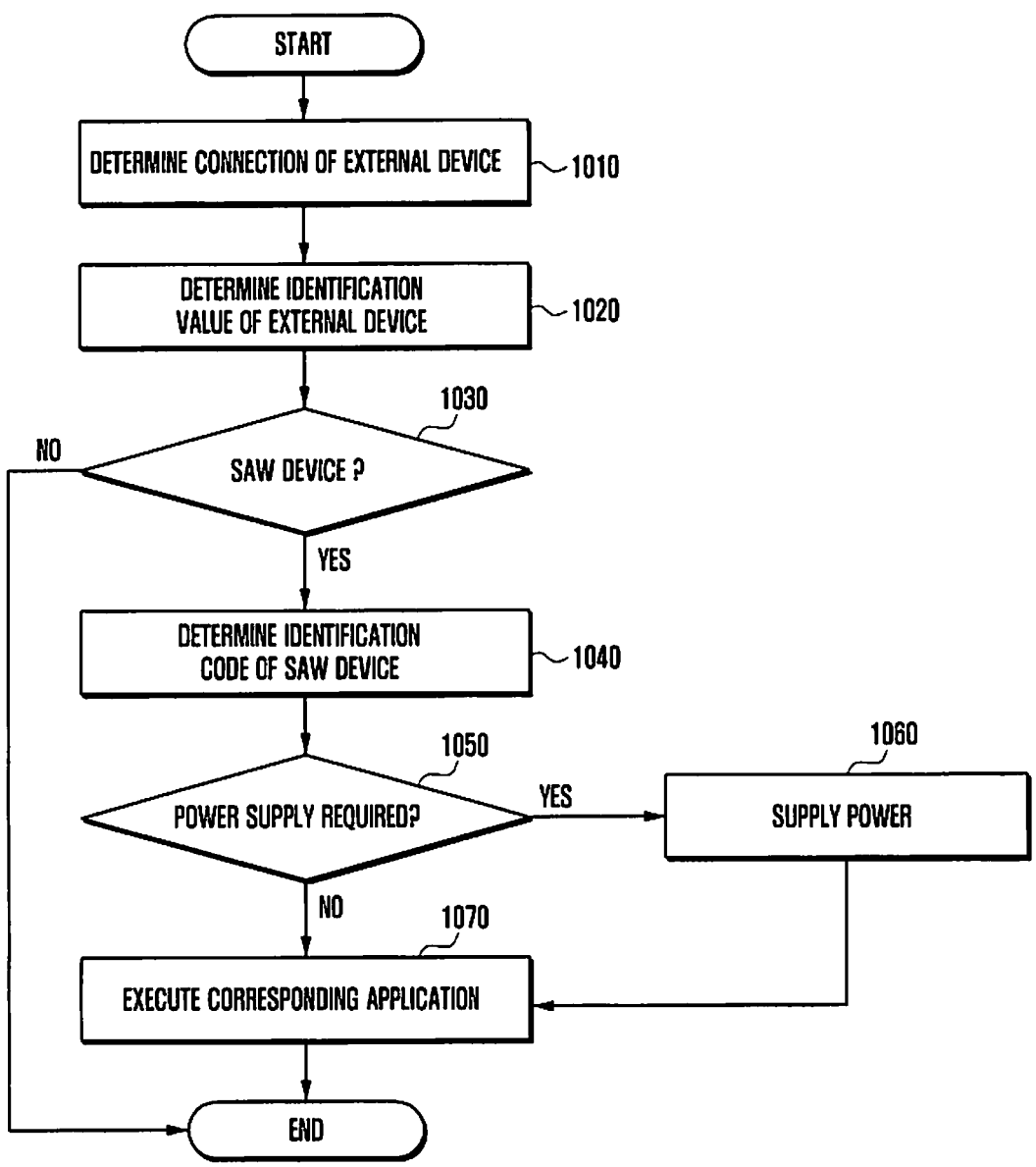
FIG. 10 is a flowchart illustrating an operation of a controller when power is supplied to an external device using a SAW device, according to another embodiment of the present invention.

FIG. 10 is a flowchart illustrating an operation of a controller when power is supplied to an external device using a SAW device, according to another embodiment of the present invention.

Referring to FIG. 10, the controller 110 determines that an external device is connected to the connector 120, in step 1010. The controller 110 determines the ID value of the external device, in step 1020. The controller 110 determines whether the external device is a SAW device based on the ID value of the external device, in step 1030. When the external device is the SAW device, the controller 110 transmits a request signal to the SAW device so that the ID code of the SAW device is determined from the reflector, in step 1040. The controller 110 determines whether the external device requires a power supply, in step 1050. If the external device requires a power supply, the controller 110 supplies power to the external device from the battery 170 through a connector, in step 1060. The controller 110 executes a corresponding application based on the ID code of the SAW device, in step 1070. If the external device does not require a power supply, the controller 110 executes the corresponding application for the external device, in step 1070. The corresponding application may be immediately executed after the ID code of the SAW device is determined, in step 1040. It can then be determined whether the power supply is required, in step 1050. In this case, if the power supply is required, a procedure of supplying the power is performed in step 1060.

Figure 11:
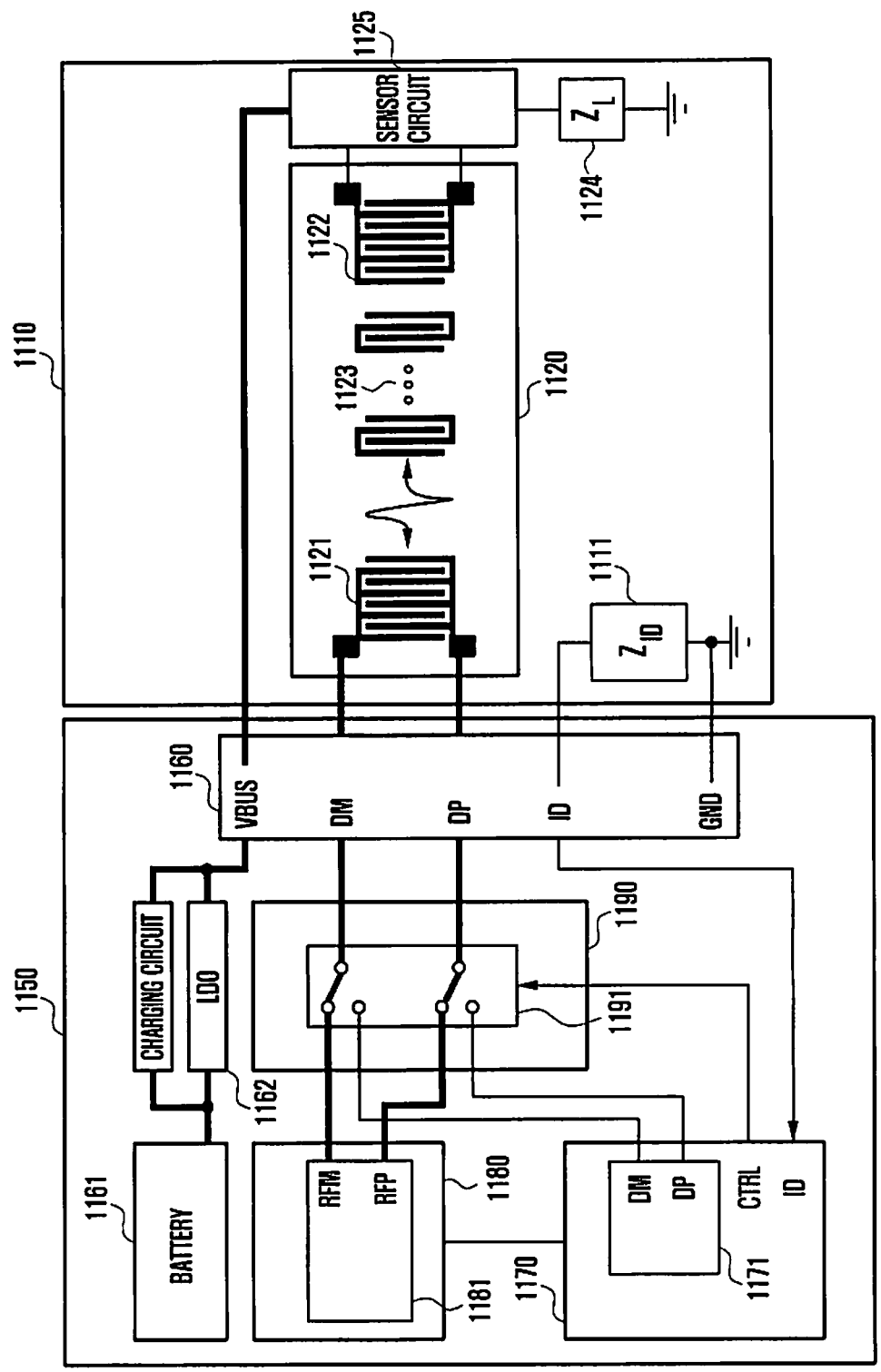
FIG. 11 is a diagram illustrating a configuration of an electronic device and an external device when power is supplied to an external device using a SAW device, according to another embodiment of the present invention.

FIG. 11 is a diagram illustrating a configuration of an electronic device and an external device when power is supplied to the external device using a SAW device, according to another embodiment of the present invention.

A SAW device 1120 may perform a power free operation. However, in some cases, there may be a case where power is required in a sensor circuit 1125 to which the SAW device 1120 is connected. In order to supply power to an external device 1110, a basic structure diagram is transformed.

Referring to FIG. 11, the external device 1110 is connected to a USB connector 1160 of an electronic device 1150. A processor 1170 may determine whether the external device 1110 is a SAW device 1120 based on an ID value $Z_{ID}$ 1111 of the external device 1110 connected to the ID (ID) terminal of the USB connector 1160. If the external device 1110 is the SAW device 1120, the processor 1170 may switch a MUX 1191 of an interface IC 1190 by using a CTRL terminal. A transceiver 1181 of a SAW device controller 1180 may transmit the fixed band signal to the SAW device 1120. The processor 1170 may determine the ID code of the SAW device from a to reflector 1123, between an input IDT 1121 and an output IDT 1122, of the SAW device 1120. A load $Z_L$ 1124 is an external sensor having impedance that varies in response to physical or chemical change.

If a supply of power is required in the external device 1110, the controller 110 may supply power to the sensor circuit 1125 of the external device 1110 through a Low DropOut Regulator (LDO) 1162 or a DC/DC Converter which is a power supply device connected to a battery 1161. The external device 1110 using the SAW device 1120 may perform no power operation, but may supply the power as described above. When the battery 1161 performs a basic operation, if a power terminal VBUS of the USB connector 1160 is connected to a charging circuit and the charger is connected to the USB connector 1160, the charging circuit may perform charging. However, when a SAW device requiring power is connected, the charging circuit is blocked. Further, the controller 110 may connect the LDO 1162 or the DC/DC converter between the battery 1161 and a power terminal VBUS of the USB connector 1160 to supply power to the external device 1110.

Figure 12:
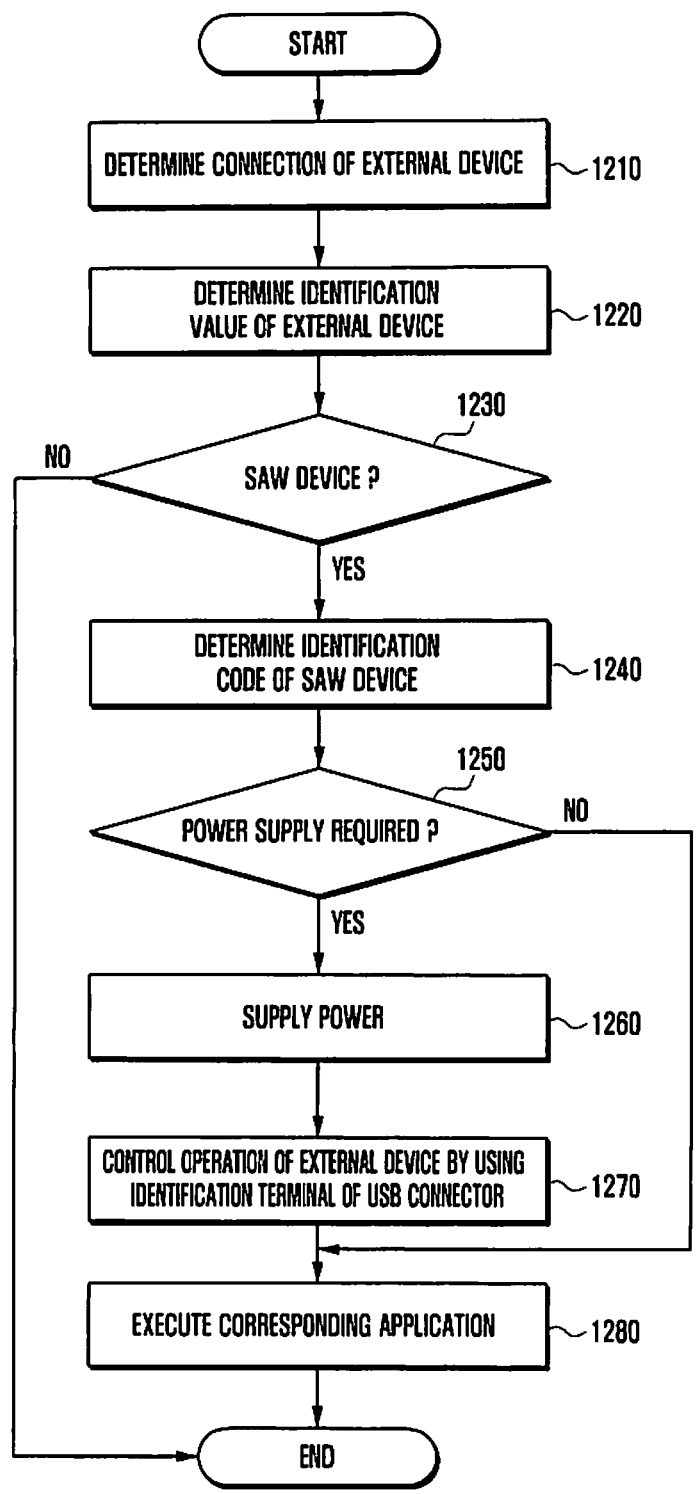
FIG. 12 is a flowchart illustrating an operation of a controller when the controller controls an operation of a sensor by using an IDentification (ID) terminal of a USB connector, according to another embodiment of the present invention.

FIG. 12 is a flowchart illustrating an operation of a controller when the controller controls an operation of a sensor by using an ID terminal of an USB connector, according to another embodiment of the present invention.

Figure 13:
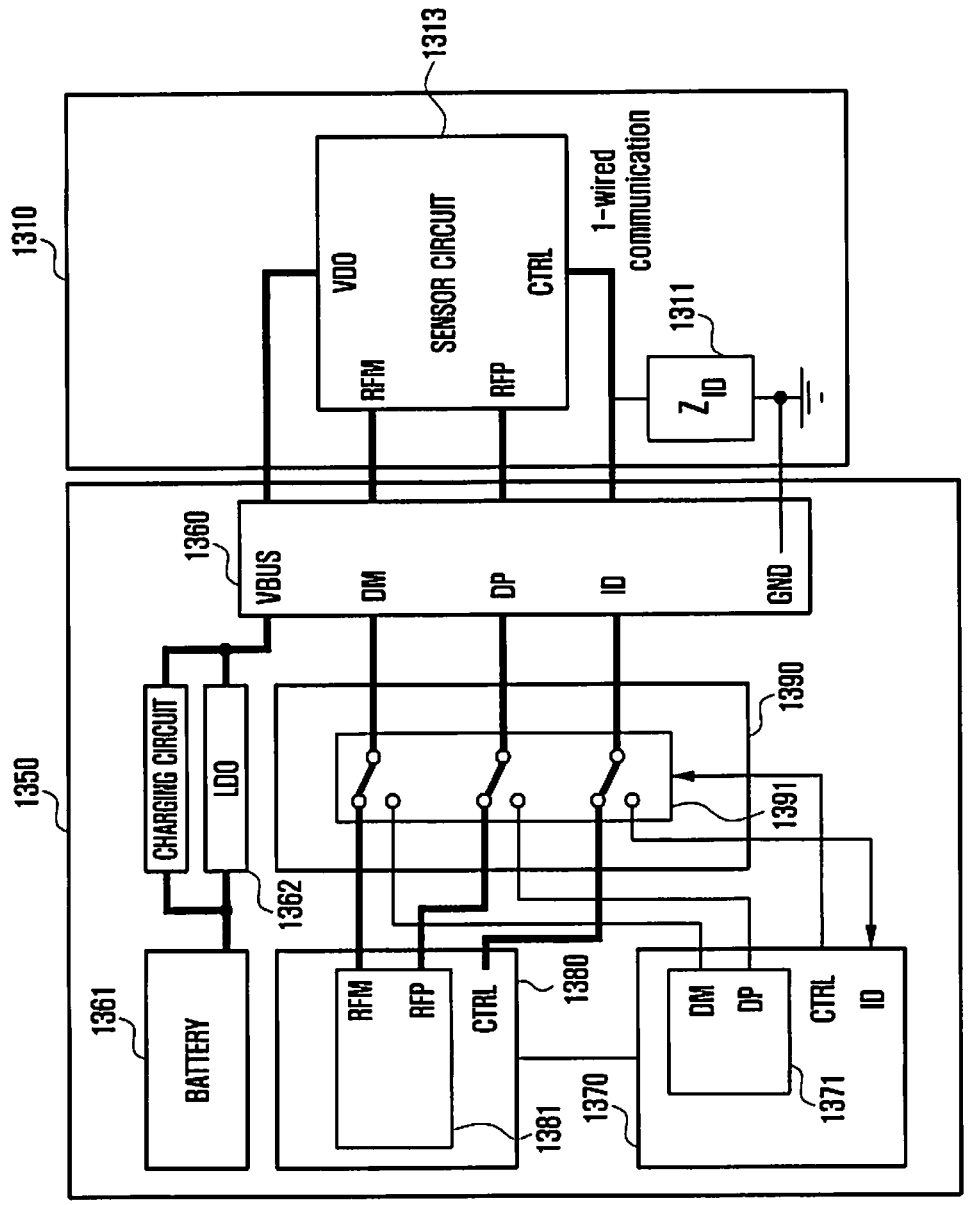
FIG. 13 is a diagram illustrating a configuration of an electronic device and an external device when the controller controls an operation of a sensor by using an ID terminal of a USB connector, according to another embodiment of the present invention.
Figure 14:
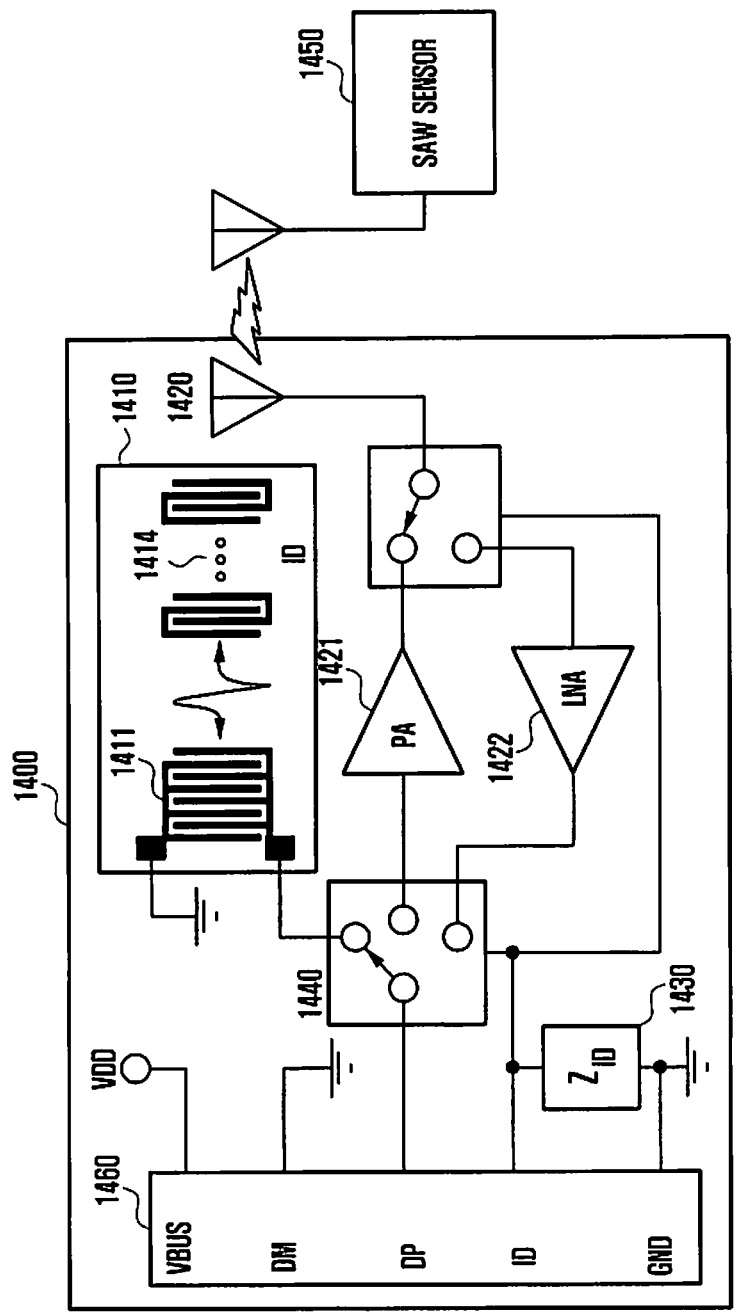
FIG. 14 is a diagram illustrating a SAW sensor wirelessly connected to an external device including an SAW device when a controller wirelessly controls an operation of a sensor by using an ID terminal of a USB connector, according to another embodiment of the present invention.

FIG. 12 illustrates a signal processing procedure corresponding to FIGS. 13 and 14.

The controller 110 determines that the external device is connected, in step 1210. The controller 110 determines an ID value of the external device, in step 1220. The controller determines whether the external device is a SAW device based on the ID value $Z_{ID}$ of the external device, in step 1230.

When the external device is the SAW device, the controller 110 determines an ID code of the SAW device to determine a type of the SAW device, in step 1240. In step 1250, the controller determines whether the external device requires a power supply. If the external device requires a power supply, the controller 110 supplies power to a sensor circuit requiring a power supply through the LDO or DC/DC converter connected to the battery 170, in step 1260. If the external device does not require the power supply, the controller 110 executes a corresponding application, in step 1280. When power is supplied from the battery 170 to the external device, the controller 110 controls an operation of the external device by using the ID terminal of the USB connector, in step 1270. When the external device is connected to the electronic device, the ID terminal of the USB connector may perform a function of reading the ID value $Z_{ID}$ of the external device. Since the ID value $Z_{ID}$ is read at the beginning of the connection, the ID terminal of the USB connector may be used to control an operation of the external device. In step 1280, the controller 110 executes a corresponding application based on a received identification code of the SAW device.

FIG. 13 is a diagram illustrating a configuration of an electronic device and an external device when the controller controls an operation of a sensor by using an ID terminal of an USB connector, according to another embodiment of the present disclosure.

Referring to FIG. 13, an external device 1310 is connected to a USB connector 1360 of an electronic device 1350. A processor 1370 determines whether the external device 1310 is a SAW device based on an ID value $Z_{ID}$ 1311 of the external device 1310 connected to the ID terminal of the USB connector 1360. The processor 1370 may switch a MUX 1391 of an interface IC 1390 by using a CTRL terminal of the processor 1370. When the external device 1310 is connected to the electronic device 1350, the ID terminal of the USB connector 1360 may perform a function of reading the ID value $Z_{ID}$ 1311 of the external device 1310. Since the ID value $Z_{ID}$ 1311 is read at the beginning of the connection, the ID terminal of the USB connector 1360 may perform another function by using various 1-wired communication methods. If the processor 1370 switches the MUX 1391, a transceiver 1381 of a SAW device controller 1380 may transmit a fixed band signal. The CTRL terminal of the SAW device controller 1380 may be connected to a CTRL terminal of a sensor circuit 1313 through the ID terminal of the USB connector 1360. That is, the SAW device controller 1380 may control the sensor circuit 1313 of the external device 1310 by using the ID terminal of the USB connector 1360. If a power supply is required for the sensor circuit 1313, the controller 110 may supply power to the sensor circuit 1313 through an LDO 1362 connected to a battery 1361. Accordingly, the electronic device 1350 may use various complex sensors.

FIG. 14 is a diagram illustrating a SAW sensor wirelessly connected to an external device including a SAW device when a controller wirelessly to controls an operation of a sensor by using an ID terminal of a USB connector, according to another embodiment of the present invention.

An external device 1400 of FIG. 14 may be manufactured to be included inside of the electronic device.

Although FIG. 14 illustrates a single-ended signal in order to simplify the diagram, a DM terminal of the USB connector may not be connected to a ground, and a circuit may be manufactured by using a differential signal as illustrated in FIG. 6.

Referring to FIG. 14, when the external device 1400 is connected to the electronic device, the processor 111 may determine an ID value $Z_{ID}$ 1430 of the external device 1400. Further, an ID terminal of a USB connector 1460 may be connected to a CTRL terminal of a SAW device controller 112 by the processor 111. The SAW device controller 112 may control the external device 1400 through the ID terminal of the USB connector 1460, connected to a switch 1440 of the external device 1400. The SAW device controller 112 may control the switch 1440 to transmit a fixed band signal to a SAW device 1410. The processor 111 may determine a type of the SAW device based on the ID code of the SAW device 1410, determined from a reflector 1414 disposed beyond a an input IDT 1411 of the SAW device 1410. In this case, the controller 110 may supply power to the external device 1400 through an LDO connected to the battery 170. The controller 110 controls the switch 1440 to transmit and receive the fixed band signal to and from the SAW device 1410, and may determine a type of the SAW device based on the ID code of the SAW device 1410. If the type of the SAW device is determined, the controller 110 may control the switch 1440 so that the fixed band signal is wirelessly communicated with an external SAW sensor 1450 through an antenna 1420. When an amplified signal is required, due to a large distance between the external device 1400 and the SAW sensor 1450, a PA 1421 may amplify the fixed band signal. An LNA 1422 may reduce a noise factor of the whole receiver. If the external device 1400 is not far from the SAW sensor 1450 or a transmission/reception sensitivity of the fixed band signal is great, the PA 1421, the LNA 1422, and the switch 1440 may be omitted. The processor 111 may execute a corresponding application to use a response signal.

While FIG. 14 illustrates a single-ended signal used to simplify a wire by grounding a DM terminal of the USB interface 1460, a DM terminal may be used to increase noise immunity by using a differential signal type.

Further, in FIG. 14, the SAW device 1410 may be removed and remaining parts may be built in the electronic device 100 so that the external SAW sensor is connected wirelessly.

Figure 15:
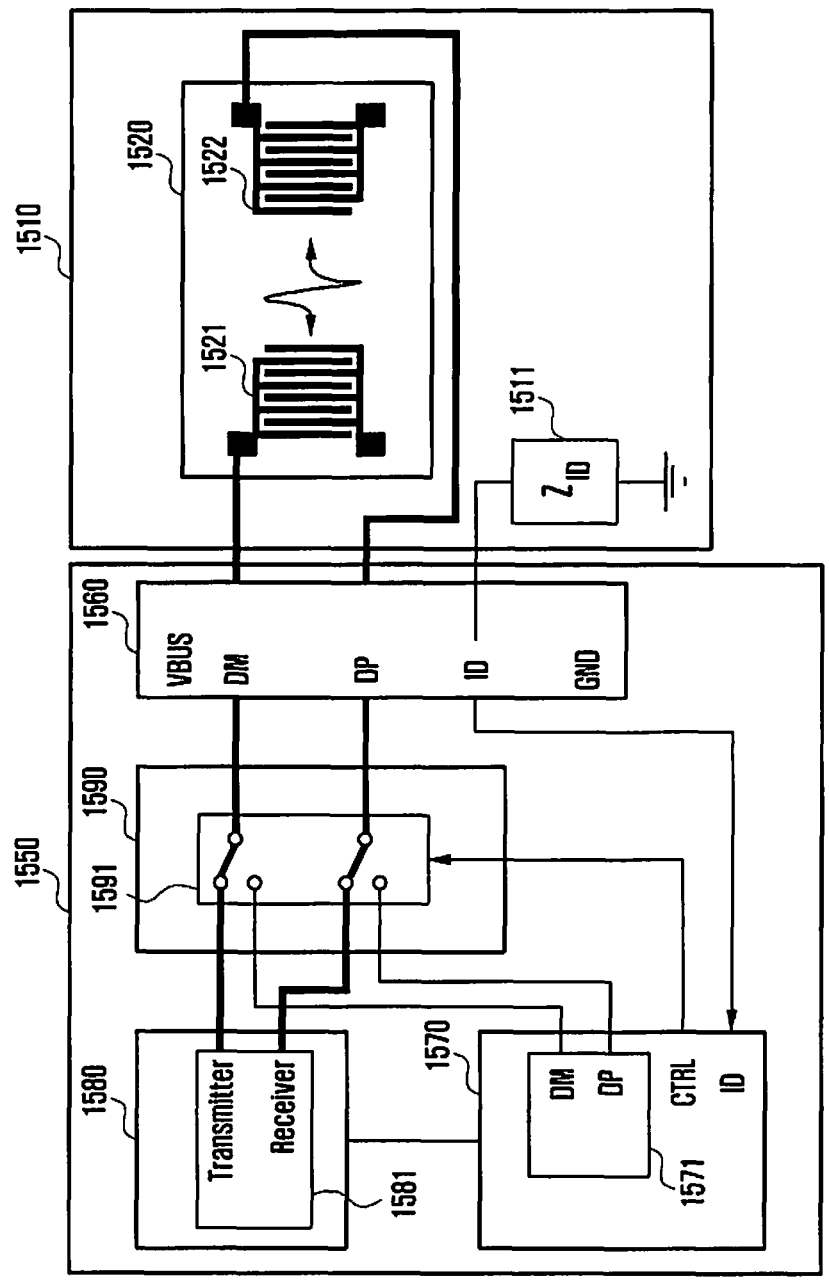
FIG. 15 is a diagram illustrating a configuration of an electronic device and an external device including a pass type SAW device, according to another embodiment of the present invention.

FIG. 15 is a diagram illustrating a configuration of an electronic device and an external device using a pass type SAW device, according to another embodiment of the present invention.

Referring to FIG. 15, if an external device 1510 is connected to an electronic device 1550, a processor 1570 of the electronic device 1550 may receive an ID value 1511 of a SAW device 1520 from an ID terminal of a USB connector 1560. If the external device 1510 is the SAW device 1520, having an input IDT 1521 and an output IDT 1522, a CTRL terminal of the processor 1570 may switch a MUX 1591 of an interface IC 1590. Accordingly, a transceiver 1581 of a SAW device controller 1580 may transmit and receive a fixed band signal to and from a transmitter and a receiver. When the SAW device 1520 is used as a sensor, the SAW device 1520 may be manufactured with a pass type. Since the SAW device 1520 is used as a sensor, a reflector and a load $Z_L$ are not separately included inside of the SAW device 1520. Since the SAW device 1520 is used as a sensor, a sensing value may be obtained by using a surface wave on a substrate. Accordingly, the processor 1570 may execute a corresponding application for the SAW device 1520.

Figure 16:
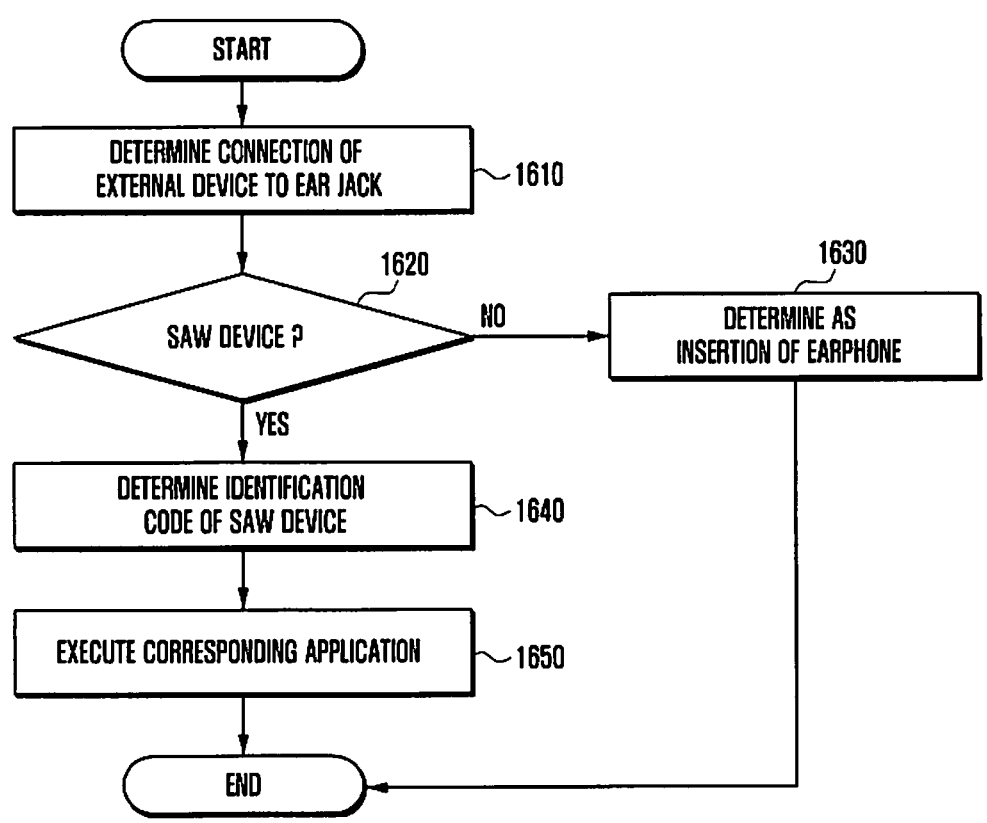
FIG. 16 is a flowchart illustrating an operation of a controller when an external device is connected to an ear jack, according to another embodiment of the present invention.

FIG. 16 is a flowchart illustrating an operation of a controller when an external device is connected to an ear jack, according to another embodiment of the present invention.

Referring to FIG. 16, the controller 110 determines that the external device is connected to an ear jack 151, in step 1610. The controller 110 sends a fixed band signal to the external device and determines whether the external device is an SAW device, in step 1620, by using the response of the SAW device, which includes, for example, an ID code. If it is determined that the external device is not the SAW device, the controller 110 determines that an earphone is inserted, in step 1630. If it is determined that the external device is the SAW device, the controller 110 determines the ID code of the SAW device, in step 1640, to determine a type of the SAW device. The controller 110 executes a corresponding application based on the ID code of the SAW device, in step 1650.

Figure 17:
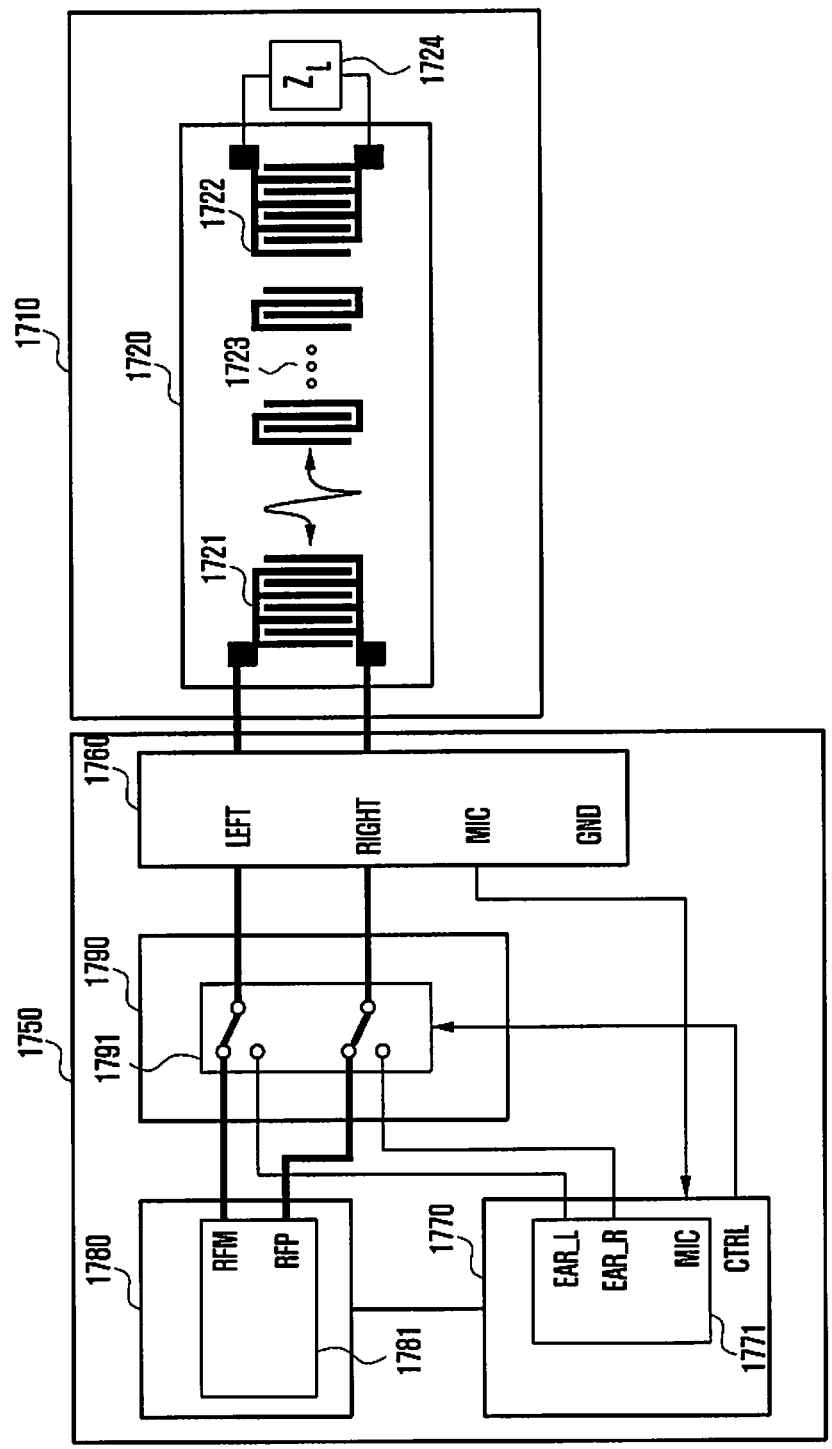
FIG. 17 is a diagram illustrating a configuration of an electronic device and an external device when the external device including a SAW device is connected to an ear jack, according to another embodiment of the present invention.

FIG. 17 is a diagram illustrating a configuration of an electronic device and an external device when the external device using a SAW device is connected to an ear jack, according to another embodiment of the present invention.

Referring to FIG. 17, a representative connector between an electronic device 1750 and an external device 1710 may be a USB connector. However, the electronic device may include an ear jack 1760, which is another physical connector. DM and DP terminals, which are input/output terminals of the USB connector, may be substituted by a LEFT terminal and a RIGHT terminal of the ear jack 1760.

Referring to FIG. 17, the external device 1710 is connected to the ear jack 1760 of the electronic device 1750. When the external device 1710 is connected to the ear jack 1760, a processor 1770 may determine whether the external device 1710 is a SAW device 1720. A CTRL terminal of the processor 1770 may switch a multiplexer 1791 of an interface IC 1790 to connect a SAW device controller 1780 with the external device 1710. The processor 1770 may transmit the fixed band signal from a transceiver 1781 of a SAW device controller 1780. The processor 1770 may determine an ID code of the SAW device 1720 in a reflector 1723, between an input IDT 1721 and an output IDT 1722, to recognize a type of the SAW device. The processor 1770 may recognize the type of the SAW device based on the ID code to execute a corresponding application.

In connection of the SAW device by using the ear jack 1760, as illustrated in FIG. 13, a power supply and a control signal may be generated by using a MIC terminal. The control signal may be transmitted to a MIC terminal, and this control signal may be rectified to be used as a power of the sensor.

As described above, in embodiments of the present invention, the electronic device recognizes the external device by a method of operating interface with the external device to execute and apply a corresponding application.

While the invention has been shown and described with reference to certain embodiments thereof, it will be understood by those skilled in the art that various changes in form and detail may be made therein without departing from the spirit and scope of the invention as defined by the appended claims.

What is claimed is:

1. An electronic device comprising:
    a connector configured to connect to an external device;
    a controller configured to determine whether the external device is a Surface Acoustic Wave (SAW) device based on an identification (ID) value of the external device, to output a request signal to the SAW device through the connector when the external device is the SAW device, to receive a response signal corresponding to the request signal from the SAW device through the connector, to recognize, from among a plurality of types of sensors, a type of a sensor of the SAW device based on an ID code included in the response signal, and to process the response signal by executing an application corresponding to the recognized type of the sensor based on the ID code, wherein each of the plurality of types of sensors corresponds to a respective one of a plurality of applications; and
    an output interface unit configured to output data according to a result of processing the response signal,
    wherein the response signal further includes detection information on either a physical change or a chemical change according to the type of the sensor of the SAW device, each of the physical change and the chemical change corresponding to a respective one of the plurality of types of sensors.

2. The electronic device of claim 1, wherein the controller comprises:
    a SAW device controller configured to transmit the request signal to the SAW device, and to receive the response signal from the SAW device;
    a switch configured to switch a path of a signal;
    a processor configured to control the switch so that a signal input/output unit is connected to the connector if it is determined that the external device is the SAW device, and to process the response signal by executing the application corresponding to the type of the sensor based on the ID code.

3. The electronic device of claim 2, wherein the controller is further configured to control the SAW device controller to selectively read the detection information from sensors if the SAW device is determined to include a composite sensor where the sensors of the composite sensor are connected in parallel.

4. The electronic device of claim 1, further comprising a power managing unit configured to supply power of a battery to the SAW device if a power terminal of the SAW device is connected to a power terminal of the connector.

5. The electronic device of claim 2, wherein the processor is further configured to recognize that the SAW device has a wireless communication function, and to transmit and receive a signal to and from a wireless communication sensor through the SAW device.

6. The electronic device of claim 5, wherein the SAW device is included in the electronic device.

7. The electronic device of claim 2, wherein:
the connector comprises an ear jack, and
the processor is further configured to control the SAW device to transmit and receive a signal to determine whether the external device is the SAW device, if the external device is connected to the ear jack.

8. The electronic device of claim 2, wherein the SAW device controller is further configured to transmit the request signal to the SAW device through one of a plurality of data terminals of the connector, and to receive the response signal through another one of the plurality of data terminals.

9. The electronic device of claim 1, wherein the request signal and the response signal are one of a single-ended signal and a differential signal.

10. A method of operating an interface with an external device in an electronic device, the method comprising the steps of:
recognizing a connection of the external device to the electronic device based on an identification (ID) value of the external device;
determining whether the external device is a Surface Acoustic Wave (SAW) device;
transmitting a request signal to the SAW device if the external device is the SAW device;
receiving a response signal corresponding to the request signal from the SAW device;
recognizing, from among a plurality of types of sensors, a type of a sensor of the SAW device based on the response signal including an ID code;
processing the response signal by executing an application corresponding to the recognized type of the sensor based on the ID code, wherein each of the plurality of types of sensors corresponds to a respective one of a plurality of applications; and
outputting data according to the processed response signal,
wherein the response signal further includes detection information on either a physical change or a chemical change according to the type of the sensor of the SAW device, each of the physical change and the chemical change corresponding to a respective one of the plurality of types of sensors.

11. The method of claim 10, wherein transmitting the request signal comprises controlling a switch so that a SAW device controller of the electronic device is connected to the SAW device.

12. The method of claim 10, wherein:
recognizing the type of the sensor of the SAW device comprises recognizing that the SAW device includes a composite sensors where sensors of the composite sensor are connected in parallel,
the request signal has a frequency band to which at least one of the sensors responds, and
the response signal is received from at least one of the sensors.

13. The method of claim 10, wherein recognizing the type of the sensor of the SAW device comprises recognizing that the SAW device has a wireless communication function, and
further comprising transmitting and receiving a signal to and from a wireless communication sensor through the SAW device having the wireless communication function.

14. The method of claim 13, wherein the SAW device is in the electronic device.

15. The method of claim 10, further comprising:
transmitting a first signal to the external device through an ear jack if the external device is connected to the ear jack; and
recognizing the external device as the SAW device when the external device transmits a second signal in response to the first signal.

16. The method of claim 10, wherein:
transmitting the request signal comprises transmitting the request signal to the SAW device through one of a plurality of data terminals, and
receiving the response signal comprises receiving the response signal from the SAW device through another one of the plurality of data terminals.

17. The method of claim 10, wherein the request signal and the response signal are one of a single-ended signal and a differential signal.

* * * * *